May 29, 1928.

M. BOLDT

TRACTOR CULTIVATOR

Filed Nov. 30, 1926

1,671,507

5 Sheets-Sheet 2

Inventor

Max Boldt,

By

Attorney

May 29, 1928.  1,671,507

M. BOLDT

TRACTOR CULTIVATOR

Filed Nov. 30, 1926   5 Sheets-Sheet 3

Inventor
Max Boldt,
By
Attorney

May 29, 1928.

M. BOLDT 1,671,507

TRACTOR CULTIVATOR

Filed Nov. 30, 1926    5 Sheets-Sheet 4

Inventor

Max Boldt,

By

Attorney

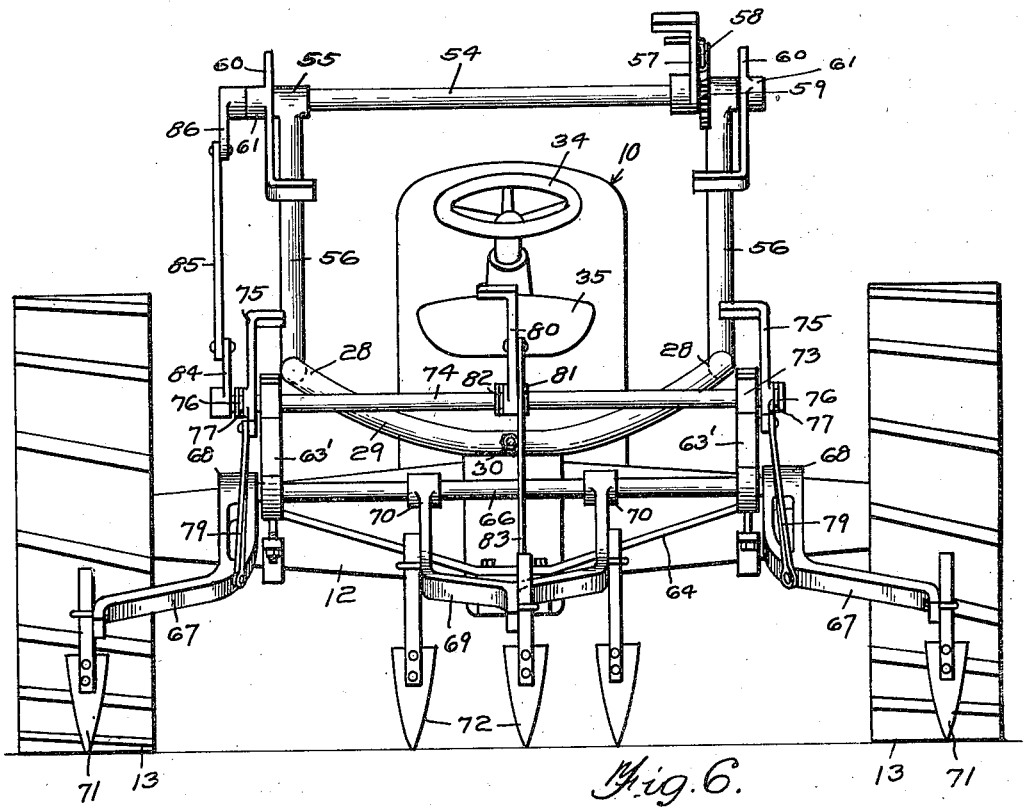

Patented May 29, 1928.

1,671,507

UNITED STATES PATENT OFFICE.

MAX BOLDT, OF YORKTOWN, TEXAS.

TRACTOR CULTIVATOR.

Application filed November 30, 1926. Serial No. 151,700.

My invention relates to improvements in tractor cultivators.

An important object of the invention is to provide means for mounting the various cultivator blades or shares, upon the tractor, in a compact manner, and so co-relate them that they are all under the convenient control of the driver.

A further object of the invention is to provide means whereby the cultivator blades or shares may be elevated individually, or as a unit.

A further object of the invention is to provide apparatus of the above mentioned character which is simple in construction, compact, and reliable in operation.

Other objects and advantages of the invention will be apparent during the course of the following description.

Figure 1:
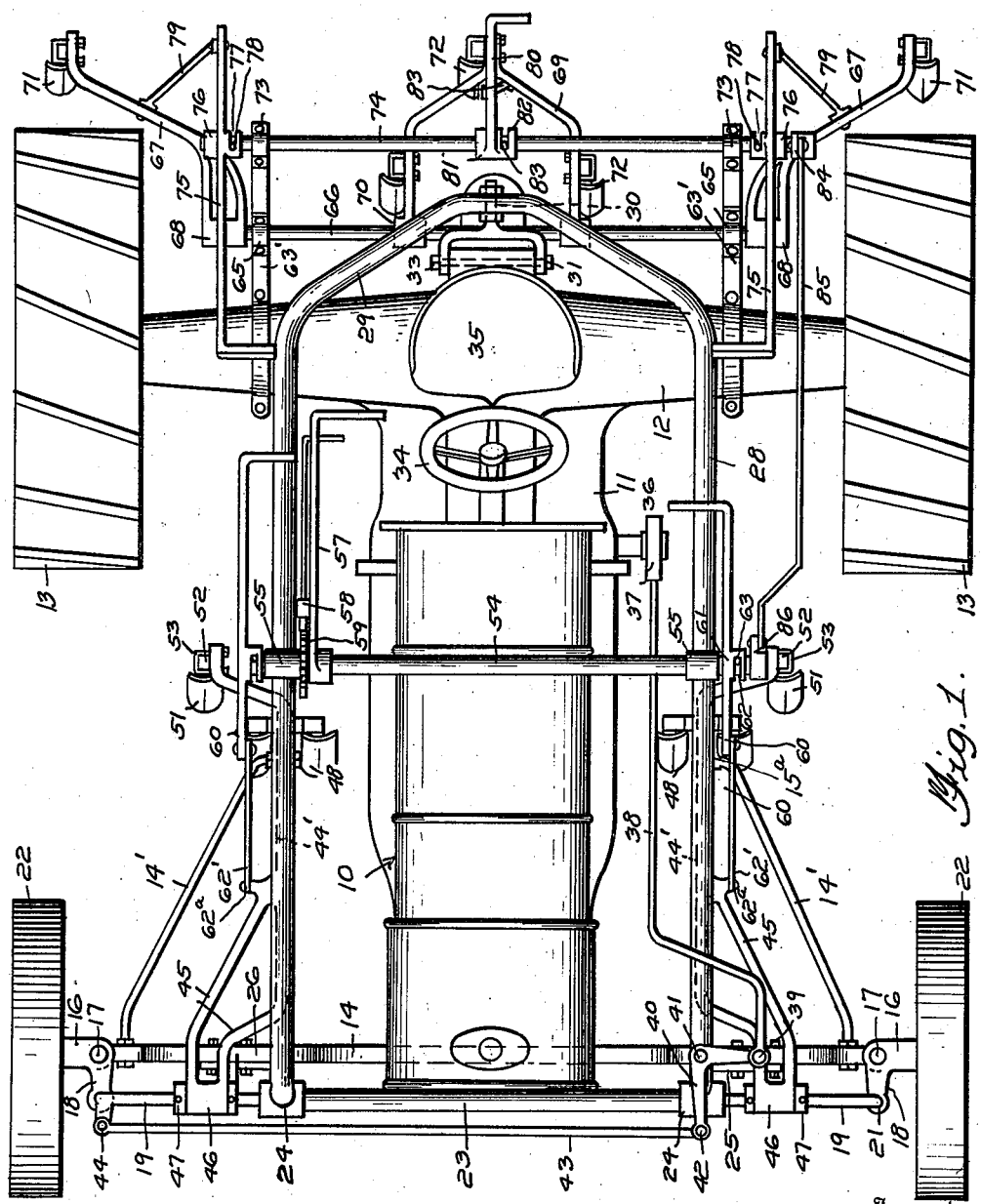
Figure 2:
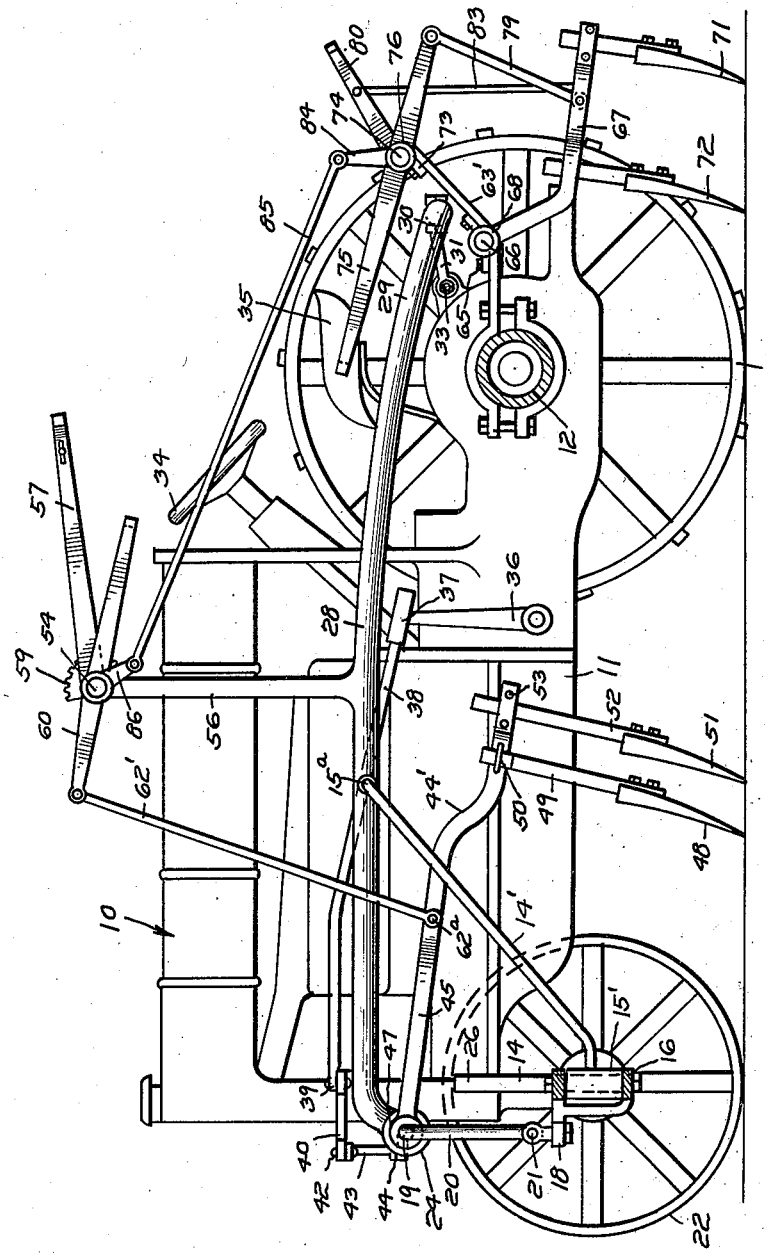
Figure 3:
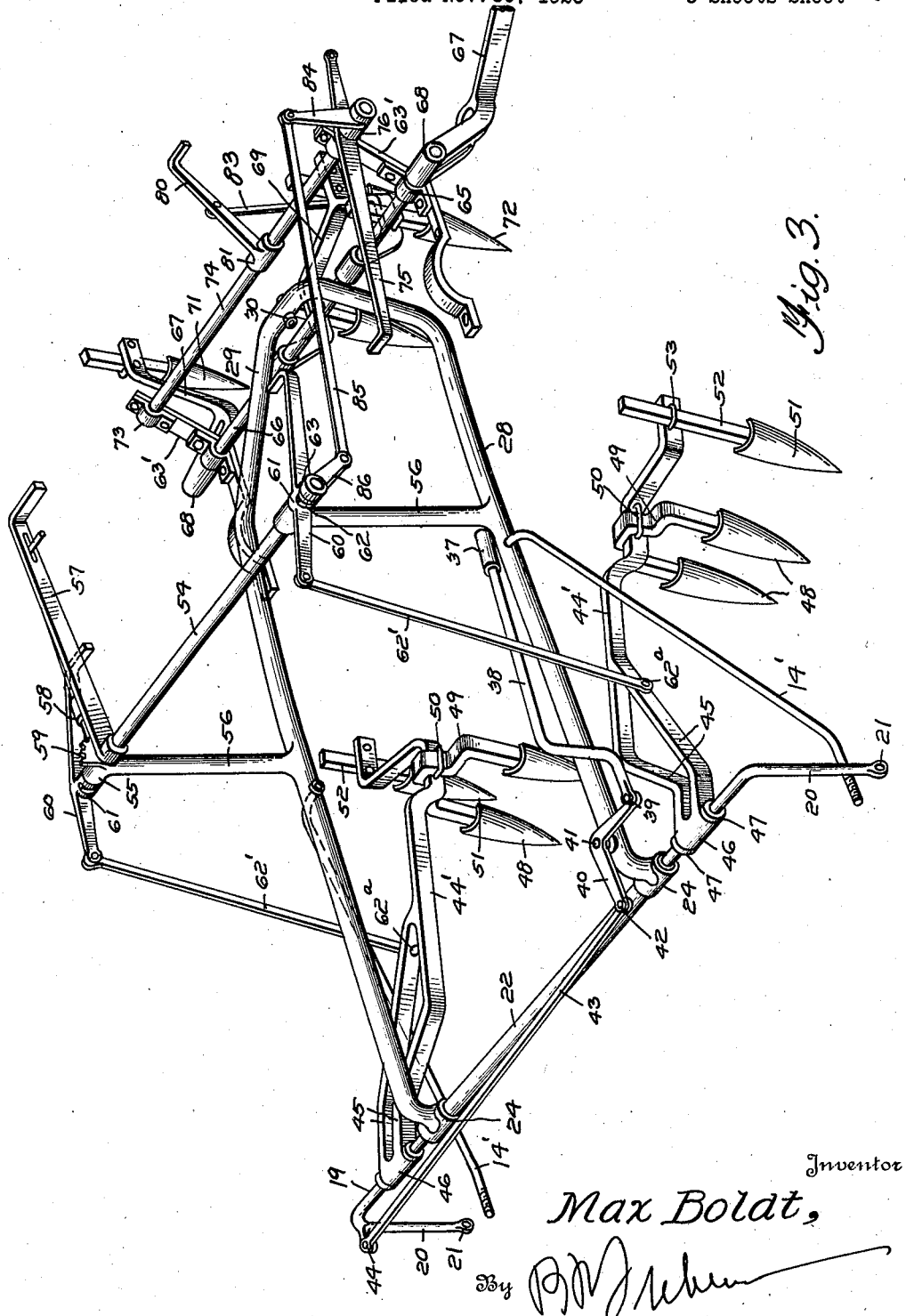
Figure 4:
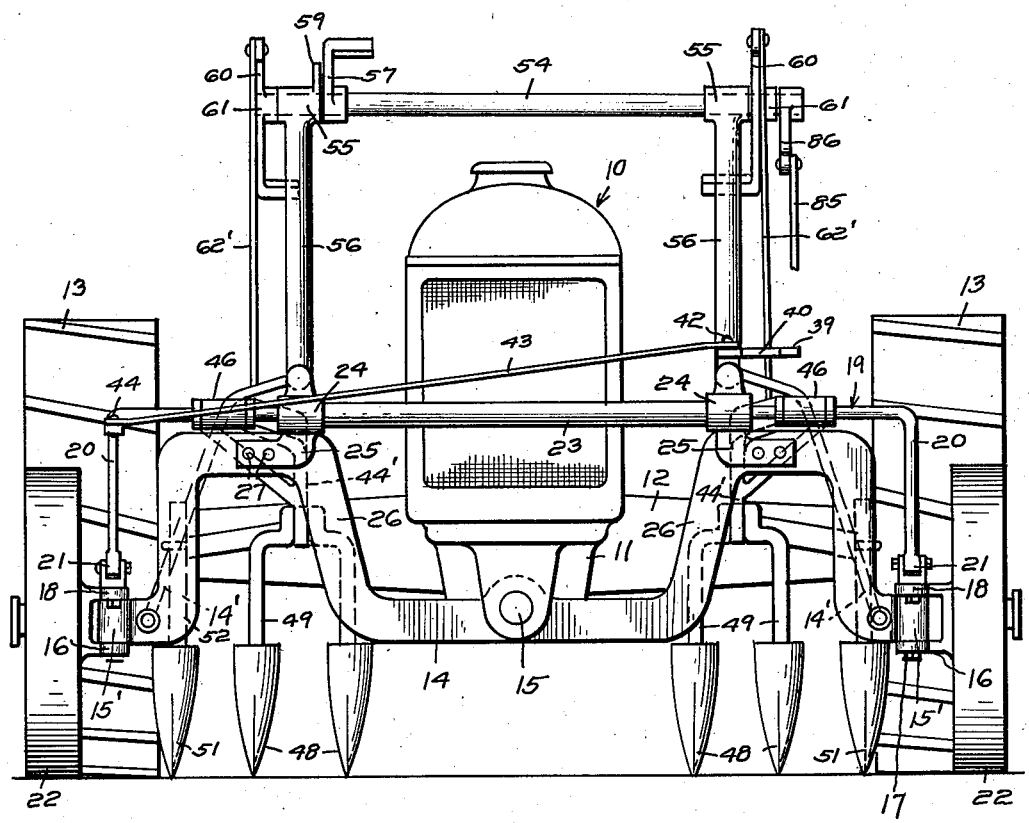
Figure 5:
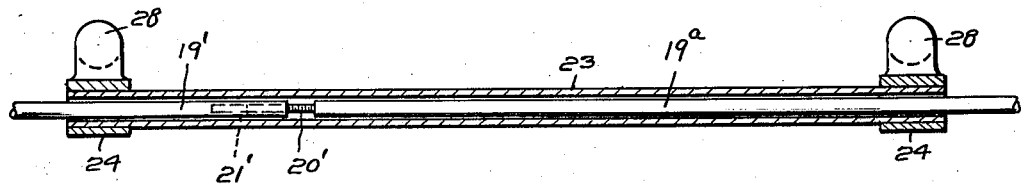

In the accompanying drawings, forming a part of this specification, and in which like numerals are employed to designate like parts throughout the same, Figure 1 is a plan view of a tractor cultivator embodying my invention, Figure 2 is a side elevation of the same, Figure 3 is a perspective view of the cultivator attachment and operating means therefor, Figure 4 is a front end elevation of the apparatus, Figure 5 is a longitudinal section through the forward guide sleeve, Figure 6 is an end elevation of the apparatus, Figure 7 is a detail view of one of the rear brackets.

In the drawings, wherein for the purpose of illustration is shown a preferred embodiment of my invention, the numeral 10 designates a tractor as a whole. This tractor embodies the usual casing 11, constituting the body portion of the same. This casing is secured at its end to the rear axle housing 12, supported by the traction wheels 13. The forward end of the casing, see particularly Figure 4, is supported by a front axle 14, pivoted thereto at 15 to swing vertically transversely of the casing 11.

Connected with the outer ends of the axle 14 are radius rods 14', extending upwardly and rearwardly and rigidly attached to a yoke 28, to be described, as shown at 15ª.

The axle 14 is provided at its ends with knuckles 15', received within knuckles 16, and pivoted thereto by means of pins 17. Preferably formed integral with the knuckles 16 are forwardly extending cranks 18. Arranged near and above the axle 14 is a transverse steering rod 19, having its ends bent downwardly to provide depending extensions 20, the lower ends of which are pivotally connected with the free ends of the cranks 18, as shown at 21, to afford sufficient flexibility, but to permit of the positive steering of the front wheels 22, supported by the usual spindles, carried by the knuckles 16.

The steering rod is slidably mounted within a transverse guide sleeve 23, rigidly mounted within collars 24, carried by brackets 25, which are rigidly bolted or otherwise attached to the inverted U-shaped portions 26 of the axle 14, as shown at 27. The sleeve 23 is, therefore, rigidly mounted upon the front axle to swing vertically therewith.

The numeral 28 designates a yoke frame, the forward ends of which are preferably formed integral with the collars 24. The yoke frame 28, embraces the body portion of the tractor and its rear converging end 29, is apertured to pivotally receive a trunnion 30, extending longitudinally of the tractor, and rigidly attached to a U-shaped bracket 31, which is pivotally mounted upon the differential casing 32, as shown at 33, to swing vertically longitudinally of the tractor. It is thus seen that the rear end of the yoke frame has a universal connection with the differential casing whereby the front axle is free to partake of vertical movements with relation to the rear axle.

As clearly shown in Figure 5, the steering rod 19 is preferably formed in two sections 19' and 19ª, having a swiveled connection, preferably formed by providing a screw-threaded extension 20' upon the section 19', engaging with a screw-threaded opening 21' in the section 19ª. This affords sufficient flexibility for the proper steering of the front wheels. It is preferred that the section 19' constitute the major length of the steering rod 19, whereby access may be readily had to the swiveled joint. The purpose of this construction is to provide means whereby the steering rod 19 may be inserted within the sleeve 23, and also to provide means for longitudinally adjusting the steering rod, thereby preventing undue play in the steering mechanism.

The numeral 34 designates the usual hand wheel, arranged in advance of the seat 35. This hand wheel is suitably geared or connected with a vertical crank 36, to swing the same longitudinally of the tractor. At its upper end this crank has a universal joint 37 connected with a forwardly extending rod 38, pivoted at its forward end, as shown at 39, with a bell crank lever 40. This bell crank lever is pivotally mounted upon the forward end of the yoke 28, as shown at 41. The bell crank lever 40 is pivotally connected, at 42, with a rod 43, and this rod extends longitudinally of the steering rod 19, and is pivotally connected therewith, at 44. It is thus seen that by turning the hand wheel 34, the steering rod 19 may be shifted longitudinally in either direction, and the front wheels 22 will be turned, for steering the machine.

The transverse steering rod 19 is arranged above the arched portions 26 of the front axle, and cultivator beams 44' extend over the arched portions 26. The forward ends of these cultivator beams are preferably forked providing arms 45, to which are secured collars 46. These collars are pivotally mounted upon the steering rod 19 and held against longitudinal displacement by rings 47, adjustably clamped upon the rod 19. By adjusting these rings the collars 46 may be longitudinally adjusted upon the rod 19, and hence the distance between the cultivator beams 44 suitably varies. Arranged near the rear ends of the cultivator beams 44 are cultivator blades or shares 48, carried by a U-shaped stock 49, secured to the beam 44 by any suitable means as through the medium of a U-bolt 50. The numeral 51 designates a cultivator blade or share carried by a stock 52, clamped to the beam 44 by means of a U-bolt 53 or the like. Any suitable means may be employed to attach the cultivator blade 22 to the beams, and this means may be adjusted, as is obvious.

Arranged above the tractor, near its center, is a transverse rock shaft 54, journaled in bearings 55, carried by the upper ends of the uprights or standards 56, rigidly attached to the yoke frame 28, as shown. This rock shaft has a universal lifting lever 57, rigidly secured thereto, to turn the same and this lever may be equipped with latch means 58, for engagement with a stationary quadrant 59, carried by one upright 56. The numeral 60 designates individual levers, having hubs 61, which are pivoted upon the rock shaft 54. As more clearly shown in Figure 1, these hubs 61 have elongated slots 62, receiving radial pins 63, rigidly attached to the rock shaft. These pins are normally at the rear ends of these slots. It is thus seen that each individual lever may have its rear depressed without turning the rock shaft 54, but when the lever is in the normal starting position and the rock shaft is turned rearwardly, the pins 63 will at once effect the rearward swinging movement of the rock shaft. Pivoted to the forward ends of the levers 60 are links 62', extending downwardly for pivotal connection with the cultivator beams 44, as shown at 62ª.

Rigidly attached to the rear axle casing 12 is a pair of rearwardly projecting straps or brackets 63', connected with a brace 64, arranged therebeneath, and rigidly attached to the differential casing, for properly supporting the same. These arms or brackets carry clamps 65, receiving a transverse rod 66, which is held against rotation. Cultivator beams 67 have their forward ends 68 pivoted upon the transverse rod 66 and an intermediate cultivator beam-frame 69 is provided at its forward ends with collars 70, which are pivoted upon the transverse rod 66. The cultivator beams 67 carry cultivator blades or shares 71, and the cultivator beam-frame 69 carries cultivator blades or shares 72.

The brackets 63' are provided at their rear ends with bearings 73, receiving a rock shaft 74. Individual levers 75 are arranged near the outer beams 73, and have hubs 76, pivoted upon the rock shaft 74. These hubs have elongated openings or slots 77, receiving radial pins 78, rigidly attached to the rock shaft. These pins normally engage the forward end walls of the slots. The rear ends of the levers 75 are connected with links 79, which are pivoted to the beams 67. By depressing the forward ends of the individual lever 75, the corresponding beam 67 is raised, without disturbing the companion beam 67. An individual lever 80 has a hub 81, pivoted upon the rod 74. This hub has an elongated slot 82, receiving a radial pin 83, carried by the rock shaft 74. This pin normally engages the forward end wall of its slot. The lever 80 has pivotal connection with a link 83, extending downwardly for pivotal connection with the beam-frame 69, as shown. By swinging the lever 80 forwardly, the beam-frame 69 may be raised, without turning the rock shaft 74. The rock shaft is provided at one end with an upstanding crank 84, Figure 2, rigidly secured thereto, and this crank has connection with a forwardly extending link 85, which is pivotally connected with a crank 86, which is rigidly mounted upon the rock shaft 54. It is thus seen that by manipulating the individual levers, the corresponding cultivator beam will be raised, and by depressing the universal lever 57, all of the cultivator beams will be simultaneously raised.

The operation of the cultivator tractor is as follows:

The operator sits upon the seat 35 and steers the tractor by the manipulation of the hand wheel 34. All of the individual levers and the universal lever 57 are in convenient reach of the operator. Any selected cultivator beam may be raised by depressing its corresponding individual lever. When it is desired to simultaneously raise all of the cultivator beams, the universal lever 57 is depressed. As above stated, the steering of the tractor is effecaed by the manipulation of the hand wheel 34. This hand wheel swings the crank 36 which shifts the rod 38 longitudinally, turning the bell crank lever 40, and shifting the steering rod 19 longitudinally.

It is to be understood that the form of my invention, herewith shown and described, is to be taken as a preferred example of the same and that various changes in the shape, size and arrangement of parts, may be resorted to without departing from the spirit of my invention, or the scope of the subjoined claims.

Having thus described my invention, I claim:—

1. A tractor including a body portion, a rear axle secured to the body portion, traction wheels carried by the rear axle, a front axle secured to the body portion and having upstanding portions, front wheels carried by the front axle, brackets rigidly secured to the upstanding portions of the front axle, a transverse guide sleeve carried by the brackets, a transverse steering rod slidable within the guide sleeve and connected with the front wheels to steer them, a yoke surrounding the body portion of the tractor and rigidly secured to the bracket, pivoted cultivator beams carried by the tractor and extending longitudinally of the yoke, means mounted upon the yoke to raise and lower the cultivator beams, and means for pivotally connecting the rear end of the yoke with the body portion of the tractor.

2. A tractor including a body portion, a rear axle secured to the body portion, traction wheels carried by the rear axle, a front axle secured to the body portion and having upstanding portions, front wheels carried by the front axle, brackets rigidly secured to the upstanding portions of the front axle, a transverse guide sleeve carried by the brackets, a transverse steering rod slidable within the guide sleeve and connected with the front wheels to steer them, a yoke surrounding the body portion of the tractor and rigidly secured to said brackets and having its rear end pivotally connected with the rear end of said body portion, a steering wheel, means mounted upon the yoke and connecting the steering wheel with the transverse steering rod, pivoted cultivator beams carried by the tractor and extending longitudinally of the yoke, and means mounted upon the yoke for raising and lowering the cultivator beams.

3. A tractor including a body portion, a rear axle secured to the body portion, traction wheels carried by the rear axle, a front axle secured to the body portion and having upstanding portions, front wheels carried by the front axle, brackets secured to the upstanding portions of the front axle, a transverse rod supported by the brackets, a yoke surrounding the body portion of the tractor and having its forward end secured to the brackets and its rear end pivotally connected with the rear end of said body portion, pivoted cultivator beams carried by the tractor and extending longitudinally of the yoke, a transverse rock-shaft mounted upon the yoke, a total lever to turn the rock-shaft, individual levers pivoted upon the rock-shaft and having lost motion connections therewith, and connecting means between the individual levers and the cultivator beams.

4. A tractor including a body portion, traction wheels supporting the rear end thereof, a front axle pivotally connected with said body portion to swing transversely thereof, front wheels carried by the front axle, a yoke connected at its forward end with the front axle and surrounding said body portion, a bracket pivotally connected with the rear end of said body portion to swing in a vertical plane longitudinally of the same, means pivotally connecting the rear end of the yoke with the last named bracket so that the yoke may turn upon its longitudinal axis with relation thereto, pivoted cultivator beams carried by the tractor and extending longitudinally of the yoke, and operating means mounted upon the yoke to raise and lower the cultivator beams.

5. A tractor including a body portion, a rear axle connected therewith, traction wheels carried by the rear axle, a front axle pivotally connected with the body portion to swing transversely of the same, front wheels secured to the front axle, a yoke surrounding said body portion and having its forward end rigidly secured to the front axle, a transverse rod secured to the forward end of the yoke, a universal connection between the rear end of the yoke and the rear end of the body portion, forward pivoted cultivator beams carried by the tractor and extending longitudinally of the yoke, a rock-shaft mounted upon the yoke, a universal lever to turn the rock-shaft, individual levers mounted upon the rock-shaft and having lost motion connections therewith, means connecting the individual levers with the cultivator beams to raise and lower them, supporting means connected with the rear axle, a rock-shaft carried by the supporting means, rear cultivator beams connected with the supporting means, individual levers mounted upon the second named rock-shaft and having lost motion connections therewith, connecting means between the last named individual levers and the rear cultivator beams, and positive means connecting the first and second named rock-shafts to cause them to turn together when the first named rock-shaft is turned in one direction.

In testimony whereof I affix my signature.

MAX BOLDT.